United States Patent
Houis et al.

(10) Patent No.: US 10,906,653 B2
(45) Date of Patent: Feb. 2, 2021

(54) AIRCRAFT AIR CONDITIONING SYSTEM WITH A REDUCED PROCESS AIR DEMAND

(71) Applicants: Airbus Operations GmbH, Hamburg (DE); Airbus SAS, Blagnac (FR)

(72) Inventors: Nicolas Houis, Lamorlaye (FR); Dariusz Krakowski, Hamburg (DE); Tim Giese, Hamburg (DE)

(73) Assignees: AIRBUS OPERATIONS GMBH, Hamburg (DE); AIRBUS SAS, Blagnac (FR)

( * ) Notice: Subject to any disclaimer, the term of this patent is extended or adjusted under 35 U.S.C. 154(b) by 262 days.

(21) Appl. No.: 15/254,067

(22) Filed: Sep. 1, 2016

(65) Prior Publication Data

US 2017/0066536 A1   Mar. 9, 2017

(30) Foreign Application Priority Data

Sep. 4, 2015  (EP) .................................... 15183821

(51) Int. Cl.
| | |
|---|---|
| *B64D 13/08* | (2006.01) |
| *B64D 13/06* | (2006.01) |
| *F25B 13/00* | (2006.01) |

(52) U.S. Cl.
CPC ............ *B64D 13/08* (2013.01); *B64D 13/06* (2013.01); *F25B 13/00* (2013.01); *B64D 2013/0688* (2013.01); *Y02T 50/50* (2013.01)

(58) Field of Classification Search
CPC . B64D 13/08; B64D 13/06; B60D 2013/0688
See application file for complete search history.

(56) References Cited

U.S. PATENT DOCUMENTS 5,511,385 A * 4/1996 Drew .................... B64D 13/06
                                                             62/172
6,012,515 A   1/2000 Stubbendorff et al.
(Continued)

FOREIGN PATENT DOCUMENTS

| DE | 102008053320 | 5/2010 |
|---|---|---|
| DE | 102010054448 | 6/2012 |

(Continued)

OTHER PUBLICATIONS

European Search Report, dated Dec. 11, 2015, priority document.

*Primary Examiner* — Elizabeth J Martin
*Assistant Examiner* — Nael N Babaa
(74) *Attorney, Agent, or Firm* — Greer, Burns & Crain, Ltd.

(57) ABSTRACT

An aircraft air conditioning system comprising an air conditioning unit adapted and configured to be supplied with compressed process air and to generate cold fresh air, a mixer adapted and configured to mix the cold fresh air from the air conditioning unit with recirculation air recirculated from an aircraft region to be air conditioned, an air outlet adapted and configured to direct mixed air from the mixer into the aircraft region, a first sensor adapted and configured to detect an actual temperature in the aircraft region, a second sensor adapted and configured to detect a temperature of the mixed air directed into the aircraft region, and a control unit adapted and configured to control an operation of the air conditioning unit in dependence on a difference between the temperature of the mixed air directed into the aircraft region and the actual temperature in the aircraft region.

9 Claims, 1 Drawing Sheet

(56) References Cited

U.S. PATENT DOCUMENTS

| | | | |
|---|---|---|---|
| 8,333,078 B2 | 12/2012 | Kelnhofer | |
| 2010/0101251 A1 | 4/2010 | Kelnhofer | |
| 2010/0240290 A1* | 9/2010 | Markwart | B64D 13/00 454/71 |
| 2013/0248164 A1 | 9/2013 | Kelnhofer et al. | |
| 2013/0269374 A1 | 10/2013 | Kelnhofer | |
| 2013/0295831 A1 | 11/2013 | Kelnhofer et al. | |
| 2015/0007595 A1* | 1/2015 | Karkhanis | F25B 49/022 62/115 |

FOREIGN PATENT DOCUMENTS

| | | |
|---|---|---|
| EP | 2647571 | 10/2013 |
| FR | 2485473 | 12/1981 |
| WO | 9823484 | 6/1998 |

\* cited by examiner

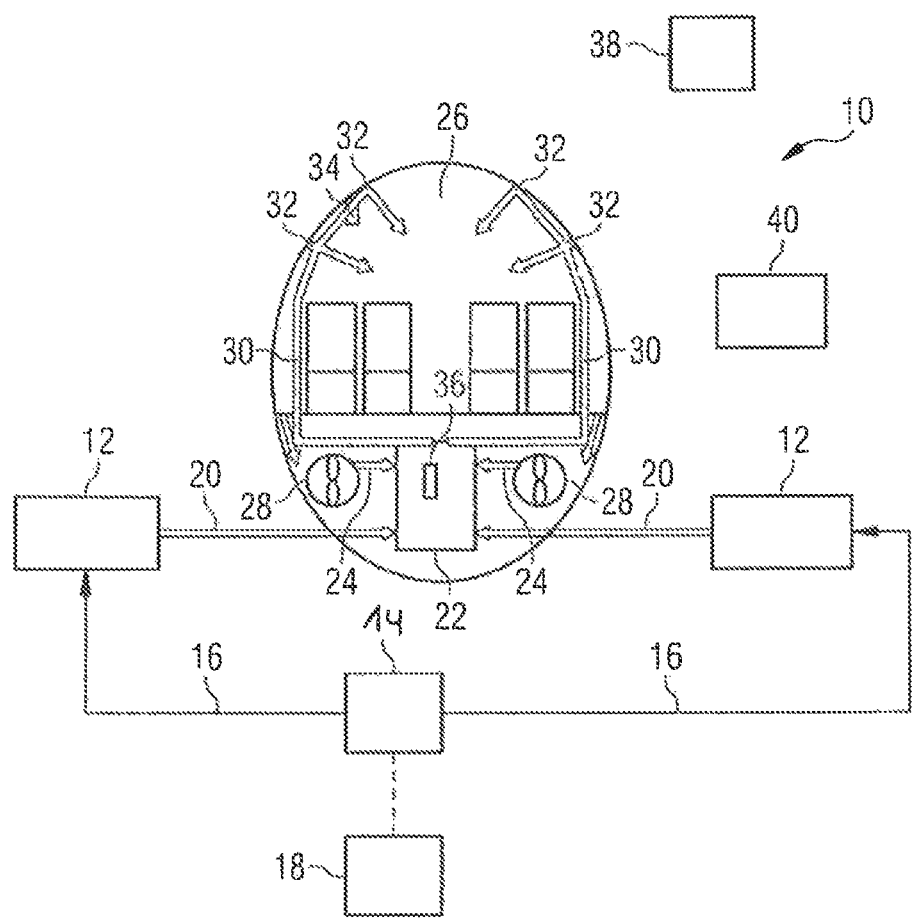

AIRCRAFT AIR CONDITIONING SYSTEM WITH A REDUCED PROCESS AIR DEMAND

CROSS-REFERENCES TO RELATED APPLICATIONS

This application claims the benefit of the European patent application No. 15 183 821.6 filed on Sep. 4, 2015, the entire disclosures of which are incorporated herein by way of reference.

BACKGROUND OF THE INVENTION

The present invention relates to an aircraft air conditioning system and a method for operating an aircraft air conditioning system.

An aircraft air conditioning system serves to cool or heat the aircraft cabin and adequately supplies fresh air into the aircraft cabin to ensure that a prescribed minimum proportion of oxygen is present in the aircraft cabin. So-called air-based air conditioning systems, as described for example in DE 10 2008 053 320 B4 and U.S. Pat. No. 8,333,078 B2 or DE 10 2010 054 448 A1 and US 2013/269374 A1, typically comprise an air conditioning unit, which is arranged, for example, in a wing root of the aircraft, and which is supplied with compressed process air. The compressed process air is provided by a process air source which may be an engine or an auxiliary power unit (APU) of the aircraft or a compressor which is designed independent from the engine or the auxiliary power unit. During flight operation of the aircraft, usually engine bleed air is used so as to supply the air conditioning unit of the aircraft air conditioning system with compressed process air. During ground operation of the aircraft the air conditioning unit of the aircraft air conditioning system, however, typically is supplied with compressed process air from the auxiliary power unit of the aircraft.

SUMMARY OF THE INVENTION

The invention is directed at an object of specifying an aircraft air conditioning system with an air conditioning unit which may be operated with a reduced compressed process air demand. Further, the invention is directed at an object of providing a method for operating an aircraft air conditioning system of this kind.

An aircraft air conditioning system comprises an air conditioning unit adapted to be supplied with compressed process air. The compressed process air may be provided to the air conditioning unit by means of a process air source which may be an engine or an auxiliary power unit (APU) of the aircraft or a compressor which is designed independent from the engine or the auxiliary power unit. The air conditioning unit may be connected to the process air source via a process air line. In the air conditioning unit, the process air, upon flowing through at least one heat exchanger as well as through various compression and expansion units, may be cooled and expanded. The air conditioning unit thus is adapted to generate cold fresh air.

The aircraft air conditioning system further comprises a mixer which is adapted to mix the cold fresh air generated by the air conditioning unit with recirculation air recirculated from an aircraft region to be air conditioned. The recirculation air may be conveyed from the aircraft region to be air conditioned to the mixer by means of a suitable conveying device, for example a blower, which may be arranged in a recirculation air line connecting the aircraft region to be air conditioned to the mixer. The connection between the mixer and the air conditioning unit may be established by means of a fresh air line. The aircraft region to be air conditioned may be an aircraft passenger cabin, a cockpit, a freight compartment or any other aircraft region and may be divided into a plurality of air conditioning zones.

Further, the aircraft air conditioning system comprises an air outlet adapted to direct mixed air from the mixer into the aircraft region to be air conditioned. The air outlet, for example, may be arranged in a ceiling region of an aircraft cabin to be air conditioned. The air outlet may be connected to the mixer by means of a mixed air line. The aircraft air conditioning system may also comprise a plurality of air outlets which may be distributed in the aircraft region to be air conditioned as desired.

A first sensor of the aircraft air conditioning system is provided which is adapted to detect an actual temperature in the aircraft region to be air conditioned. If desired or necessary, a plurality of first sensors may be provided which may be distributed in the aircraft region to be air conditioned. The actual temperature detected by the plurality of first sensors then may be an average actual temperature which is obtained by averaging the individual actual temperature values detected by the individual first sensors. A second sensor serves to detect a temperature of the mixed air which is directed into the aircraft region to be air conditioned via the air outlet.

Finally, the aircraft air conditioning system comprises a control unit which is adapted to control an operation of the air conditioning unit in dependence on a difference between the temperature of the mixed air directed into the aircraft region to be air conditioned and the actual temperature in the aircraft region to be air conditioned. Thus, as compared to conventional air conditioning systems, wherein the operation of the air conditioning unit is controlled mainly based on a comparison of a desired temperature in the aircraft region to be air conditioned and the actual temperature in the aircraft region to be air conditioned, but without considering the thermal dynamic behavior of the aircraft region to be air conditioned, in the aircraft air conditioning system described herein, the difference between the temperature of the mixed air directed into the aircraft region to be air conditioned and the actual temperature in the aircraft region to be air conditioned is considered upon controlling the operation of the air conditioning unit. As a result, undesirably large or undesirably small differences between the temperature of the mixed air directed into the aircraft region to be air conditioned and the actual temperature in the aircraft region to be air conditioned can be avoided.

For example, upon start-up of the aircraft air conditioning system at a high ambient temperature and thus a high actual temperature in the aircraft region to be air conditioned, by considering the difference between the temperature of the mixed air directed into the aircraft region to be air conditioned and the actual temperature in the aircraft region to be air conditioned upon controlling the operation of the air conditioning unit, the supply of an unreasonably large volume flow of very cold mixed air to the aircraft region to be air conditioned can be avoided. Similarly, upon start-up of the aircraft air conditioning system at a low ambient temperature and thus a low actual temperature in the aircraft region to be air conditioned, consideration of the difference between the temperature of the mixed air directed into the aircraft region to be air conditioned and the actual temperature in the aircraft region to be air conditioned upon controlling the operation of the air conditioning unit prevents the supply of an unreasonably large volume flow of very warm mixed air to the aircraft region to be air conditioned.

As a result, the process air demand of the air conditioning unit, which is particularly high in operational situations of the air conditioning unit, wherein the air conditioning unit is required to provide a large volume flow of very cold or very warm fresh air, can be reduced without in fact affecting the cooling or heating performance of the aircraft air conditioning system. Instead, the operation of the air conditioning unit can be adjusted to the real cooling or heating requirements of the aircraft region to be air conditioned.

This allows a reduction of the fuel consumption of the process air source. Furthermore, thermal stresses occurring within the process air source can be reduced which increases the lifetime of the process air source. In this regard it should be noted that a dependency between thermal stresses occurring within the process air source and a process air demand of the air conditioning unit is highly nonlinear. Consequently, even small reductions in the compressed process air demand may lead to a significant reduction of thermal stresses acting on the process air source.

In a preferred embodiment of the aircraft air conditioning system, the control unit is adapted to control the operation of the air conditioning unit in such a manner that the difference between the temperature of the mixed air directed into the aircraft region to be air conditioned and the actual temperature in the aircraft region to be air conditioned does not exceed a threshold value. The threshold value may be determined, for example, based on the type and the performance of the process air source so as to effectively reduce both fuel consumption and wear due to thermal stresses of the process air source. Furthermore, the threshold value may be set to such a value that the cooling or heating performance of the aircraft air conditioning system, in particular upon cooling the aircraft region to be air conditioned down from high temperatures and upon heating the aircraft region to be air conditioned up from low temperatures, is within a desired range.

Preferably, the control unit of the aircraft air conditioning system further is adapted to control the operation of the air conditioning unit in dependence on a change rate of the actual temperature in the aircraft region to be air conditioned. This allows a control of the transient behavior of the aircraft region to be air conditioned upon cooling or heating, again with the aim to avoid operational situations of the air conditioning unit, wherein the air conditioning unit is required to provide a large volume flow of very cold or very warm fresh air.

Specifically, the control unit may be adapted to control the operation of the air conditioning unit in such a manner that the change rate of the actual temperature in the aircraft region to be air conditioned does not exceed a threshold value. Like the threshold value for the difference between the temperature of the mixed air directed into the aircraft region to be air conditioned and the actual temperature in the aircraft region to be air conditioned, also the threshold value for the change rate of the actual temperature in the aircraft region to be air conditioned may be determined, for example, based on the type and the performance of the process air source so as to effectively reduce both fuel consumption and wear due to thermal stresses of the process air source. Furthermore, the threshold value may be set to such a value that the time that is required for cooling or heating the aircraft region to be air conditioned is within a desired range.

In a preferred embodiment, the aircraft air conditioning system may further comprise an input device which is adapted to input a desired temperature in the aircraft region to be air conditioned. The input device may be a device which automatically determines the desired temperature in the aircraft region to be air conditioned. Preferably, however, the input device comprises a user interface via which a user may enter a desired temperature in the aircraft region to be air conditioned. The control unit may be adapted to control the operation of the air conditioning unit in dependence on the desired temperature in the aircraft region. Thus, like in the conventional aircraft air conditioning systems, also in the aircraft air conditioning system as described herein, the desired temperature in the aircraft region to be air conditioned is used as a control parent meter for controlling operation of the air conditioning unit so as to ensure that the aircraft region to be air conditioned is heated or cooled as desired.

Basically, the second sensor for detecting the temperature of the mixed air directed into the aircraft region may be provided in the region of the air outlet or in the region of a mixed air line connecting the mixer to the air outlet. Preferably, however, the second sensor is arranged in the mix of the aircraft air conditioning system.

In a method for operating an aircraft air conditioning system, compressed process air is supplied to an air conditioning unit. Cold fresh air is generated by means of the air conditioning unit. The cold fresh air generated by the air conditioning unit is mixed with recirculation air recirculated from an aircraft region to be air conditioned by means of a mixer. Mixed air is directed from the mixer into the aircraft region to be air conditioned. An actual temperature in the aircraft region to be air conditioned is detected by means of a first sensor. Further, a temperature of the mixed air directed into the aircraft region to be air conditioned is detected by means of a second sensor. An operation of the air conditioning unit is controlled in dependence on a difference between the temperature of the mixed air directed into the aircraft region to be air conditioned and the actual temperature in the aircraft region to be air conditioned.

The operation of the air conditioning unit may be controlled in such a manner that the difference between the temperature of the mixed air directed into the aircraft region to be air conditioned and the actual temperature in the aircraft region to be air conditioned does not exceed a threshold value.

In the method for operating an aircraft air conditioning system, the operation of the air conditioning unit may further be controlled in dependence on a change rate of the actual temperature in the aircraft region to be air conditioned.

Preferably, the operation of the air conditioning unit is controlled in such a manner that the change rate of the actual temperature in the aircraft region to be air conditioned does not exceed a threshold value.

The method for operating an aircraft air conditioning system preferably further comprises the step of inputting a desired temperature in the aircraft region to be air conditioned. The operation of the air conditioning unit may be controlled in dependence on the desired temperature in the aircraft region to be air conditioned.

The second sensor for detecting the temperature of the mixed air directed into the aircraft region may be arranged in the mixer of the aircraft air conditioning system.

BRIEF DESCRIPTION OF THE DRAWINGS

A preferred embodiment of the invention in the following will be described in more detail with reference to the appended schematic drawing, in which The FIGURE shows an aircraft air conditioning system according to the invention.

DETAILED DESCRIPTION OF THE PREFERRED EMBODIMENTS

The FIGURE shows an aircraft air conditioning system 10 which, for redundancy reasons, comprises two identical air conditioning units 12. The air conditioning units 12 are connected to a process air source 14. In the embodiment of an aircraft air conditioning system 10 depicted in the FIGURE, the process air source 14 is designed in the form of an auxiliary power unit of an aircraft equipped with the aircraft air conditioning system 10. It is, however, also conceivable to use either an engine of the aircraft or a compressor that is designed independent from the auxiliary power unit and the engine of the aircraft as a process air source which provides compressed process air to the air conditioning units 12. The connection between the air conditioning units 12 and the process air source 14 is established via respective process air line 16. Operation of the process air source 14 is controlled by means of a process air source control unit 18.

In the air conditioning units 12, the compressed process air is cooled and expanded. Each air conditioning unit 12 thus is adapted to generate cold fresh air which exits the air conditioning unit 12 via a fresh air line 20 connecting the air conditioning unit 12 to a mixer 22. The mixer 22 further is connected to recirculation air lines 24. Recirculation air discharged from an aircraft region 26 to be air conditioned such as, for example, an aircraft cabin, is supplied to the mixer 22 via the recirculation air lines 24. In order to convey the recirculation air from the aircraft region 26 to be air conditioned, through the recirculation air lines 24 and finally into the mixer 22, suitable conveying devices 28, which may be designed in the form of blowers, are arranged in the recirculation air lines 24. Within the mixer 22, the cold fresh air provided by the air conditioning units 12 is mixed with the recirculation air supplied to the mixer 22 via the recirculation air lines 24 so as to generate mixed air.

As becomes apparent from the FIGURE, the mixed air is discharged from the mixer 22 via respective mixed air lines 30. The mixed air lines 30 connect the mixer 22 to respective air outlets 32 which, in the embodiment of an aircraft air conditioning system 10 depicted in the drawing, are arranged in a ceiling region of the aircraft region 26 to be air conditioned. Via the air outlets 32, the mixed air provided by the mixer 22 is supplied into the aircraft region 26 to be air conditioned.

The aircraft air conditioning system 10 further comprises a first sensor 34 which is arranged in the ceiling region of the aircraft region 26 to be air conditioned. The first sensor 34 serves to detect an actual temperature Tact in the aircraft region 26 to be air conditioned. A second sensor 36 serves to detect a temperature $T_{mix}$ of the mixed air directed into the aircraft region 26 to be air conditioned via the air outlets 32. The second sensor 36 may be arranged in the mixer 22 of the aircraft air conditioning system 10 as shown in the drawing. Preferably, however, the second sensor 36 is arranged in the mixed air lines 30.

The aircraft air conditioning system 10 further comprises an input device 38 which is adapted to input a desired temperature $T_{des}$ in the aircraft region 26 to be air conditioned. Basically, the input device 38 may be adapted to automatically determine the desired temperature $T_{des}$ in the aircraft region 26 to be air conditioned. Preferably, however, the input device 38 comprises a user interface which a user may manually enter the desired temperature $T_{des}$ in the aircraft region 26 to be air conditioned.

Signals provided by the first sensor 34, the second sensor 36 and the input device 38 are provided to a control unit 40. In the embodiment of an aircraft air conditioning system 10 depicted in the drawing, the first sensor 34 and the input device 38 are directly connected to the control unit 40. It is, however, also conceivable to feed the signals of the first sensor 34 and the input device 38 to a separate temperature control unit which in turn communicates with the control unit 40. The control unit 40 is adapted to control the operation of the aircraft air conditioning system 10 and in particular the operation of the air conditioning units 12. Further, the control unit 40 is connected to the process air source control unit 18. The process air source control unit 18 controls the operation of the process air source 14 in dependence on control signals provided by the control unit 40. Specifically, the process air source control unit 18 controls the operation of the process air source 14 in dependence on a process air demand determined by the control unit 40.

In the following, operation of the aircraft air conditioning system 10 will be described. During operation of the aircraft air conditioning system 10, the control unit 40 controls the operation of the air conditioning units 12 in dependence on the various signals provided to the control unit 40 from the first and the second sensor 34, 36 and the input device 38. First, upon comparing the actual temperature Tact in the aircraft region 26 to be air conditioned with the desired temperature $T_{des}$ provided by the input device 38, the control unit 40 determines whether the aircraft region 26 to be air conditioned requires heating or cooling. Furthermore, the control unit 40 calculates a required process air demand, i.e., a volume flow of process air which is to be provided to the air conditioning units 12 by the process air source 14. A respective control signal which is indicated of the required process air demand is provided from the control unit 40 to the process air source control unit 18. The process air source control unit 18 then controls the operation of the process air source 14 in dependence on said control signal.

Unlike than in conventional aircraft air conditioning systems 10, wherein operation of the air conditioning units 12 and the process air source 14 typically are controlled so as to cool or heat the aircraft region 26 with maximum available performance, the control unit 40, however, beside the difference between the actual temperature Tact in the aircraft region 26 to be air conditioned and the desired temperature $T_{des}$ in the aircraft region 26 to be air conditioned, upon controlling the operation of the air conditioning units 12 and upon calculating the control signal for the process air source control unit 18 also considers a difference between the temperature $T_{mix}$ of the mixed air directed into the aircraft region 26 to be air conditioned via the air outlets 32 and the actual temperature Tact in the aircraft region 26 to be air conditioned.

Thus, during operation of the aircraft air conditioning system 10, undesirably large or undesirably small differences between the temperature $T_{mix}$ of the mixed air directed into the aircraft region 26 to be air conditioned and the actual temperature Tact in the aircraft region 26 to be air conditioned can be avoided. For example, upon start-up of the aircraft air conditioning system 10 at a high ambient temperature and thus a high actual temperature Tact in the aircraft region 26 to be air conditioned, the supply of an unreasonably large volume flow of very cold mixed air to the aircraft region 26 to be air conditioned can be avoided. Similarly, upon start-up of the aircraft air conditioning system 10 at a low ambient temperature and thus a low actual temperature Tact in the aircraft region 26 to be air conditioned, the supply of an unreasonably large volume flow of very warm mixed air to the aircraft region 26 to be air conditioned is prevented.

As a result, the process air demand of the air conditioning units 12, which is particularly high in operational situations of the air conditioning units 12, wherein the air conditioning units 12 are required to provide a large volume flow of very cold or very warm fresh air, can be reduced without in fact affecting the cooling or heating performance of the aircraft air conditioning system 10. Instead, the operation of the air conditioning units 12 can be adjusted to the real cooling or heating requirements of the aircraft region to be air conditioned. This allows a reduction of the fuel consumption of the process air source 14 and reduces thermal stresses occurring within the process air source 14.

Specifically, the control unit 14 controls the operation of the air conditioning units 12 and calculates the control signal for the process air source control unit 18 in such a manner that the difference between the temperature $T_{mix}$ of the mixed air directed into the aircraft region 26 to be air conditioned and the actual temperature Tact in the aircraft region 26 to be air conditioned does not exceed a threshold value. The threshold value may be determined, for example, based on the type and the performance of the process air source 14 so as to effectively reduce both fuel consumption and wear due to thermal stresses of the process air source 14. Furthermore, the threshold value may be set to such a value that the cooling or heating performance of the aircraft air conditioning system 10, in particular upon cooling the aircraft region 26 to be air conditioned down from high temperatures and upon heating the aircraft region 26 to be air conditioned up from low temperatures, is within a desired range.

Furthermore, the control unit 40 controls the operation of the air conditioning units 12 and calculates the control signal for the process air source control unit 18 in dependence on a change rate of the actual temperature Tact in the aircraft region 26 to be air conditioned. Specifically, the control unit 40 controls the operation of the air conditioning units 12 and calculates the control signal for the process air source control unit 18 in such a manner that the change rate of the actual temperature $T_{act}$ in the aircraft region 26 to be air conditioned does not exceed a threshold value. This allows a control of the transient behavior of the aircraft region 26 to be air conditioned upon cooling or heating, again with the aim to avoid operational situations of the air conditioning units 12, wherein the air conditioning units 12 are required to provide a large volume flow of very cold or very warm fresh air.

Like the threshold value for the difference between the temperature $T_{mix}$ of the mixed air directed into the aircraft region 26 to be air conditioned and the actual temperature $T_{act}$ in the aircraft region 26 to be air conditioned, also the threshold value for the change rate of the actual temperature $T_{act}$ in the aircraft region 26 to be air conditioned may be determined, for example, based on the type and the performance of the process air source 14 so as to effectively reduce both fuel consumption and wear due to thermal stresses of the process air source 14. Furthermore, the threshold value may be set to such a value that the time that is required for cooling or heating the aircraft region 26 to be air conditioned is within a desired range.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft air conditioning system comprising:
   an air conditioner adapted to be supplied with compressed process air and to generate cold fresh air,
   a mixer adapted to mix the cold fresh air generated by the air conditioner with recirculation air recirculated from an aircraft region to be air conditioned,
   an air outlet adapted to direct mixed air from the mixer into the aircraft region to be air conditioned,
   a first sensor adapted to detect an actual temperature in the aircraft region to be air conditioned,
   a second sensor adapted to detect a temperature of the mixed air directed into the aircraft region to be air conditioned, and
   a controller adapted to control an operation of the air conditioner in dependence on a difference between
      the temperature of the mixed air directed into the aircraft region to be air conditioned, and
      the actual temperature in the aircraft region to be air conditioned,
   wherein the controller is adapted to control the operation of the air conditioner in such a manner that the difference between the temperature of the mixed air directed into the aircraft region to be air conditioned and the actual temperature in the aircraft region to be air conditioned does not exceed a temperature difference threshold value,
   wherein the controller is further adapted to control the operation of the air conditioner in dependence on a change rate of the actual temperature in the aircraft region to be air conditioned, the change rate is adapted to control a volume flow of cold or warm fresh air to avoid operational situations wherein the air conditioner is required to provide a volume flow of cold or warm fresh air,
   wherein the controller is adapted to control the operation of the air conditioner in such a manner that the change rate of the actual temperature in the aircraft region to be air conditioned does not exceed a change rate threshold value.

2. The aircraft air conditioning system according to claim 1, further comprising an input device adapted to input a desired temperature in the aircraft region to be air conditioned, wherein the controller is adapted to control the operation of the air conditioner in dependence on the desired temperature in the aircraft region.

3. The aircraft air conditioning system according to claim 1, wherein the second sensor is arranged in the mixer of the aircraft air conditioning system.

4. A method for operating an aircraft air conditioning system, the method comprising the steps of:
   supplying compressed process air to an air conditioner,
   generating cold fresh air by means of the air conditioner, mixing the cold fresh air generated by the air conditioner with recirculation air recirculated from an aircraft region to be air conditioned by means of a mixer, directing mixed air from the mixer into the aircraft region to be air conditioned, detecting an actual temperature in the aircraft region to be air conditioned by means of a first sensor, detecting a temperature of the mixed air directed into the aircraft region to be air conditioned, and controlling an operation of the air conditioner in dependence on a difference between
the temperature of the mixed air directed into the aircraft region to be air conditioned, and
the actual temperature in the aircraft region to be air conditioned, wherein the operation of the air conditioner is controlled in such a manner that the difference between the temperature of the mixed air directed into the aircraft region to be air conditioned and the actual temperature in the aircraft region to be air conditioned does not exceed a temperature difference threshold value, wherein the controller is further adapted to control the operation of the air conditioner in dependence on a change rate of the actual temperature in the aircraft region to be air conditioned, the change rate is adapted to control a volume flow of cold or warm fresh air to avoid operational situations wherein the air conditioner is required to provide a volume flow of cold or warm fresh air, wherein the controller is adapted to control the operation of the air conditioner in such a manner that the change rate of the actual temperature in the aircraft region to be air conditioned does not exceed a change rate threshold value.

5. The method according to claim 4, further comprising the step of inputting a desired temperature in the aircraft region to be air conditioned, wherein the operation of the air conditioner is controlled in dependence on the desired temperature in the aircraft region to be air conditioned.

6. The method according to claim 4, wherein the second sensor is arranged in the mixer of the aircraft air conditioning system.

7. An aircraft air conditioning system comprising:
an air conditioner adapted to be supplied with compressed process air and to generate cold fresh air,
a mixer adapted to mix the cold fresh air generated by the air conditioner with recirculation air recirculated from an aircraft region to be air conditioned,
an air outlet adapted to direct mixed air from the mixer into the aircraft region to be air conditioned,
a first sensor adapted to detect an actual temperature in the aircraft region to be air conditioned,
a second sensor adapted to detect a temperature of the mixed air directed into the aircraft region to be air conditioned, and
a controller configured to control an operation of the air conditioner by calculating a difference between
the temperature of the mixed air directed into the aircraft region to be air conditioned, and
the actual temperature in the aircraft region to be air conditioned, wherein the controller is adapted to control the operation of the air conditioner in such a manner that the calculated difference between the temperature of the mixed air directed into the aircraft region to be air conditioned and the actual temperature in the aircraft region to be air conditioned is compared to a temperature difference threshold value and is prevented from exceeding the temperature difference threshold value, wherein the controller is further adapted to control the operation of the air conditioner in dependence on a change rate of the actual temperature in the aircraft region to be air conditioned, the change rate is adapted to control a volume flow of cold or warm fresh air to avoid operational situations wherein the air conditioner is required to provide a volume flow of cold or warm fresh air, wherein the controller is adapted to control the operation of the air conditioner in such a manner that the change rate of the actual temperature in the aircraft region to be air conditioned does not exceed a change rate threshold value.

8. The aircraft air conditioning system according to claim 7, further comprising an input device adapted to input a desired temperature in the aircraft region to be air conditioned, wherein the controller is configured to control the operation of the air conditioner in dependence on the desired temperature in the aircraft region.

9. The aircraft air conditioning system according to claim 7, wherein the second sensor is arranged in the mixer of the aircraft air conditioning system.

* * * * *